(12) United States Patent
Yu et al.

(10) Patent No.: US 11,614,775 B2
(45) Date of Patent: Mar. 28, 2023

(54) ACCOMMODATING CYLINDER, TOUCH PEN ASSEMBLY, AND PROTECTIVE CASE

(71) Applicant: BEIJING XIAOMI MOBILE SOFTWARE CO., LTD., Beijing (CN)

(72) Inventors: Xiaojie Yu, Beijing (CN); Juanjuan Jiang, Beijing (CN); Hongwei Jin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/562,107

(22) Filed: Dec. 27, 2021

(65) Prior Publication Data

US 2023/0037203 A1 Feb. 2, 2023

(30) Foreign Application Priority Data

Jul. 28, 2021 (CN) .......................... 202110859079.3

(51) Int. Cl.
*G06F 1/16* (2006.01)
*G06F 3/0354* (2013.01)

(52) U.S. Cl.
CPC .......... *G06F 1/1616* (2013.01); *G06F 1/1656* (2013.01); *G06F 1/1679* (2013.01); *G06F 3/03545* (2013.01); *G06F 2200/1632* (2013.01)

(58) Field of Classification Search
CPC ...................................................... G06F 1/169
See application file for complete search history.

(56) References Cited

U.S. PATENT DOCUMENTS

| 5,067,573 | A | * | 11/1991 | Uchida | G06F 1/1626 |
| | | | | | 382/314 |
| 5,703,626 | A | * | 12/1997 | Itoh | G06F 3/03545 |
| | | | | | 345/173 |
| 5,750,939 | A | * | 5/1998 | Makinwa | G06F 3/03545 |
| | | | | | 178/19.03 |
| 5,796,575 | A | * | 8/1998 | Podwalny | G06F 1/1679 |
| | | | | | 361/679.55 |
| 8,059,391 | B2 | * | 11/2011 | Chang | G06F 1/1624 |
| | | | | | 361/679.08 |

(Continued)

OTHER PUBLICATIONS

European Patent Application No. 21218075.6, Search and Opinion dated Jun. 22, 2022; 10 pages.

*Primary Examiner* — Adrian S Wilson
(74) *Attorney, Agent, or Firm* — Cozen O'Connor

(57) ABSTRACT

An accommodating cylinder, a touch pen assembly, and a protective case are provided. The accommodating cylinder includes a cylinder body, a first magnetic member, a second magnetic member and a pen base. The cylinder body has an accommodating cavity. The first magnetic member is configured to generate a first magnetic field, and is arranged in the accommodating cavity. At least one of the first magnetic member and the second magnetic member is a coil, and the second magnetic member is arranged in the accommodating cavity and movable between a retracted position and an extended position. The pen base is connected with the second magnetic member. The second magnetic member is configured to move relative to the first magnetic member from the retracted position to the extended position, and to drive the pen base to move from an inserted position to a pop-up position in a first power-on state.

20 Claims, 10 Drawing Sheets

(56) References Cited

U.S. PATENT DOCUMENTS

| | | | | |
|---|---|---|---|---|
| 8,242,389 | B2* | 8/2012 | Chen | G06F 1/1684 |
| | | | | 345/179 |
| 8,259,091 | B2* | 9/2012 | Yeh | G06F 1/1626 |
| | | | | 345/179 |
| 8,415,572 | B2* | 4/2013 | Yang | G06F 3/03545 |
| | | | | 345/179 |
| 8,737,049 | B2* | 5/2014 | Minaguchi | G06F 1/1616 |
| | | | | 361/679.55 |
| 9,323,356 | B2* | 4/2016 | Kuo | G06F 3/03545 |
| 9,395,753 | B2* | 7/2016 | Amano | B65D 25/005 |
| 9,971,379 | B2* | 5/2018 | Griffin, II | G06F 1/1607 |
| 10,091,338 | B2* | 10/2018 | Amit | H04M 1/026 |
| 10,120,420 | B2* | 11/2018 | Bathiche | G06F 1/1632 |
| 10,139,926 | B2* | 11/2018 | Murauyou | G06F 1/1626 |
| 10,401,982 | B2* | 9/2019 | Seo | G06F 3/04162 |
| 10,802,617 | B2* | 10/2020 | Lin | G06F 3/03545 |
| 11,340,658 | B2* | 5/2022 | Kuo | G06F 3/03545 |
| 11,385,688 | B2* | 7/2022 | Wu | G06F 1/1656 |
| 2002/0190823 | A1 | 12/2002 | Yap | |
| 2003/0076302 | A1* | 4/2003 | Langstraat | G06F 1/169 |
| | | | | 345/161 |
| 2014/0049894 | A1* | 2/2014 | Rihn | H01F 7/0263 |
| | | | | 335/219 |
| 2018/0210507 | A1* | 7/2018 | Morrison | G06F 1/203 |
| 2019/0346881 | A1* | 11/2019 | Chai | G06F 1/1681 |
| 2020/0174529 | A1* | 6/2020 | Goh | G06F 3/0416 |
| 2020/0241660 | A1* | 7/2020 | Lin | G06F 3/03545 |
| 2021/0099025 | A1* | 4/2021 | Gaule | H02J 50/10 |

* cited by examiner left ←—A—→ right left ←—A—→ right

US 11,614,775 B2

ACCOMMODATING CYLINDER, TOUCH PEN ASSEMBLY, AND PROTECTIVE CASE

CROSS-REFERENCE TO RELATED APPLICATION

The present application is based on and claims priority to Chinese Patent Application No. 202110859079.3, filed on Jul. 28, 2021, the entire content of which is incorporated herein by reference.

TECHNICAL FIELD

The present disclosure relates to a field of electronic devices, and more particularly, to an accommodating cylinder, a touch pen assembly, and a protective case.

BACKGROUND

More and more consumers find portability of communication devices to be desirable in life, and the use of a pad or tablet communication device is becoming more and more popular. A touch pen has become a standard attachment for use with pads or tablets as part of providing portability for consumers. In the related art, a stylus or touch pen holder, or accommodating portion, is arranged on a tablet computer or a keyboard associated with the tablet computer. However, the accommodating portion has problems such as the inconvenient access to the touch pen and the lack of safe storage in all possible usage scenario, for example.

SUMMARY

Embodiments of a first aspect of the present disclosure propose an accommodating cylinder, including a cylinder body, a first magnetic member, a second magnetic member and a pen base. The cylinder body has an accommodating cavity. The first magnetic member is configured to generate a first magnetic field, and is arranged in the accommodating cavity. At least one of the first magnetic member and the second magnetic member is a coil, and the second magnetic member is arranged in the accommodating cavity and movable between a retracted position and an extended position. The pen base is connected with the second magnetic member. The second magnetic member is configured to move relative to the first magnetic member from the retracted position to the extended position, and to drive the pen base to move from an inserted position to a pop-up position in a first power-on state.

Embodiments of a second aspect of the present disclosure propose a touch pen assembly, including an accommodating cylinder and a touch pen. The accommodating cylinder includes a cylinder body, a first magnetic member, a second magnetic member and a pen base. The cylinder body has an accommodating cavity. The first magnetic member is configured to generate a first magnetic field, and is arranged in the accommodating cavity. At least one of the first magnetic member and the second magnetic member is a coil, and the second magnetic member is arranged in the accommodating cavity and movable between a retracted position and an extended position. The pen base is connected with the second magnetic member. The second magnetic member is configured to move relative to the first magnetic member from the retracted position to the extended position, and to drive the pen base to move from an inserted position to a pop-up position in a first power-on state. The touch pen is detachably fitted with the pen base, and a part of the touch pen in the pop-up position extends out of the accommodating cavity.

Embodiments of a third aspect of the present disclosure propose a protective case, including a support plate and an accommodating cylinder. The protective case is configured to be assembled with a tablet computer and a keyboard. The support plate includes a first connecting portion configured to be detachably connected to the tablet computer and a second connecting portion configured to be detachably connected to the keyboard. The first connecting portion and the second connecting portion are connected to the accommodating cylinder. The accommodating cylinder includes a cylinder body, a first magnetic member, a second magnetic member and a pen base. The cylinder body has an accommodating cavity. The first magnetic member is configured to generate a first magnetic field, and is arranged in the accommodating cavity. At least one of the first magnetic member and the second magnetic member is a coil, and the second magnetic member is arranged in the accommodating cavity and movable between a retracted position and an extended position. The pen base is connected with the second magnetic member. The second magnetic member is configured to move relative to the first magnetic member from the retracted position to the extended position, and to drive the pen base to move from an inserted position to a pop-up position in a first power-on state.

DETAILED DESCRIPTION

Figure 1:
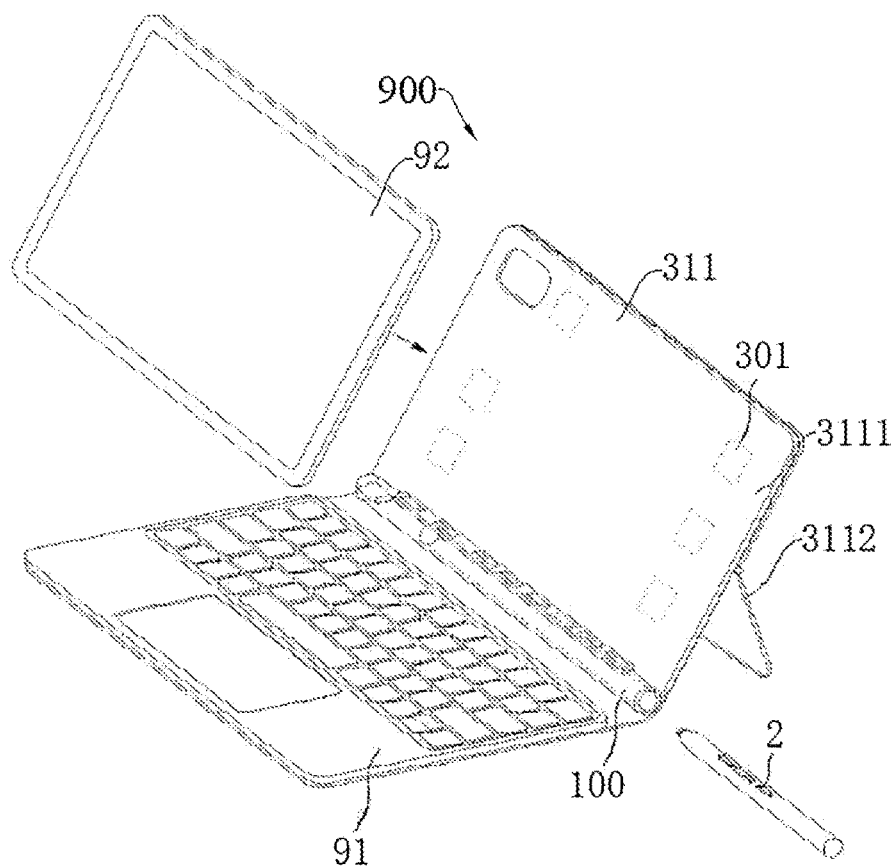
FIG. 1 is an exploded view of a tablet computer assembly according to an embodiment of the present disclosure.

Embodiments of the present disclosure will be further described in detail below, examples of the embodiments are illustrated with reference to the accompanying drawings. The embodiments described below with reference to the accompanying drawings are exemplary, are merely configured to explain the present application, and cannot be construed as a limit to the present application.

An accommodating cylinder 100 according to an embodiment of the present disclosure is described below with reference to FIGS. 10-16. The accommodating cylinder 100 according to the embodiment of the present disclosure includes a cylinder body 1, a first magnetic member, a second magnetic member and a pen base 5. The cylinder body 1 has an accommodating cavity (not shown). The first magnetic member is configured to generate a first magnetic field, and the first magnetic member is arranged in the accommodating cavity. At least one of the first magnetic member and the second magnetic member is a coil. The second magnetic member is arranged in the accommodating cavity and movable between a retracted position and an extended position.

The pen base 5 is connected with the second magnetic member. In a first power-on state, the second magnetic member moves relative to the first magnetic member from the retracted position to the extended position, and the second magnetic member drives the pen base 5 to move from an inserted position to a pop-up position.

When the first magnetic member is configured as a magnet, the second magnetic member is configured as a coil. In the first power-on state, i.e., when a current is supplied to the second magnetic member, the second magnetic member may be fitted with the first magnetic field generated by the first magnetic member, the second magnetic member is subject to a pushing force (an ampere force or a repulsive force) in the first magnetic field generated by the first magnetic member, and the pushing force enables the second magnetic member to move relative to the first magnetic member in the accommodating cavity.

When the first magnetic member is configured as a coil, the second magnetic member is configured as a magnet. In the first power-on state, i.e., when a current is supplied to the first magnetic member, the first magnetic member can generate the first magnetic field, the second magnetic member may be fitted with the first magnetic field generated by the first magnetic member, the second magnetic member is subject to a pushing force (i.e. a repulsive force) in the magnetic field generated by the first magnetic member, and the pushing force enables the second magnetic member to move relative to the first magnetic member in the accommodating cavity.

When the first magnetic member is configured as a coil, the second magnetic member may also be configured as a coil. In the first power-on state, i.e., when a current is supplied to each of the first magnetic member and the second magnetic member, the first magnetic member may generate the first magnetic field, the second magnetic member may be fitted with the first magnetic field generated by the first magnetic member, the second magnetic member is subject to a pushing force (i.e. a repulsive force) in the magnetic field generated by the first magnetic member, and the pushing force enables the second magnetic member to move relative to the first magnetic member in the accommodating cavity.

The accommodating cylinder 100 according to the embodiment of the present disclosure is provided with the first magnetic member and the second magnetic member fitted with each other in the accommodating cavity. When the touch pen 2 is connected with the pen base 5 in the inserted position, through supplying the current to the coil, i.e., in the first power-on state, the second magnetic member can drive the pen base 5 and the touch pen 2 to move from the inserted position to the pop-up position, such that the touch pen 2 can be easily taken out. Since the pen base 5 and the touch pen 2 can be automatically transferred from the inserted position to the pop-up position, a part of the touch pen 2 exposed of the accommodating cavity can be reduced or the touch pen 2 can be completely located in the accommodating cavity, in the inserted position. Thus, the risk that the touch pen 2 drops caused by being mistakenly touched can be avoided, so as to achieve the safe storage of the touch pen 2.

Thus, the accommodating cylinder 100 according to the embodiment of the present disclosure has advantages of the convenient access to the touch pen 2 and the safe storage of the touch pen 2 or the like.

An accommodating cylinder 100, a touch pen assembly 200, a protective case 300, and a tablet computer assembly 900 according to an embodiment of the present disclosure are described in detail below with reference to FIGS. 1-16.

As illustrated in FIG. 1, an embodiment of the present disclosure provides a tablet computer assembly 900. The tablet computer assembly 900 according to the embodiment of the present disclosure includes a protective case 300, a tablet computer 92, and a keyboard 91.

Figure 2:
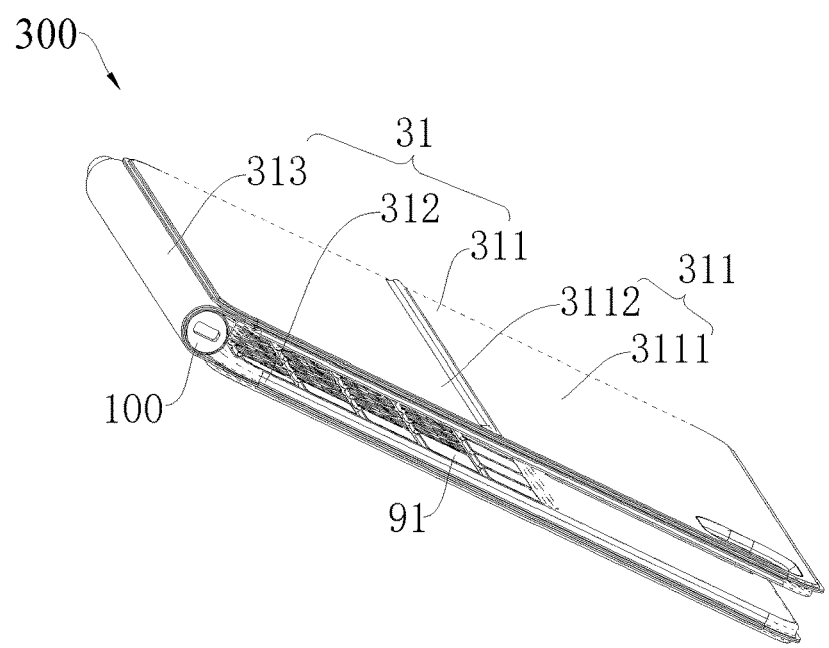
FIG. 2 is a schematic view of a protective case fitted with a keyboard according to an embodiment of the present disclosure.
Figure 3:
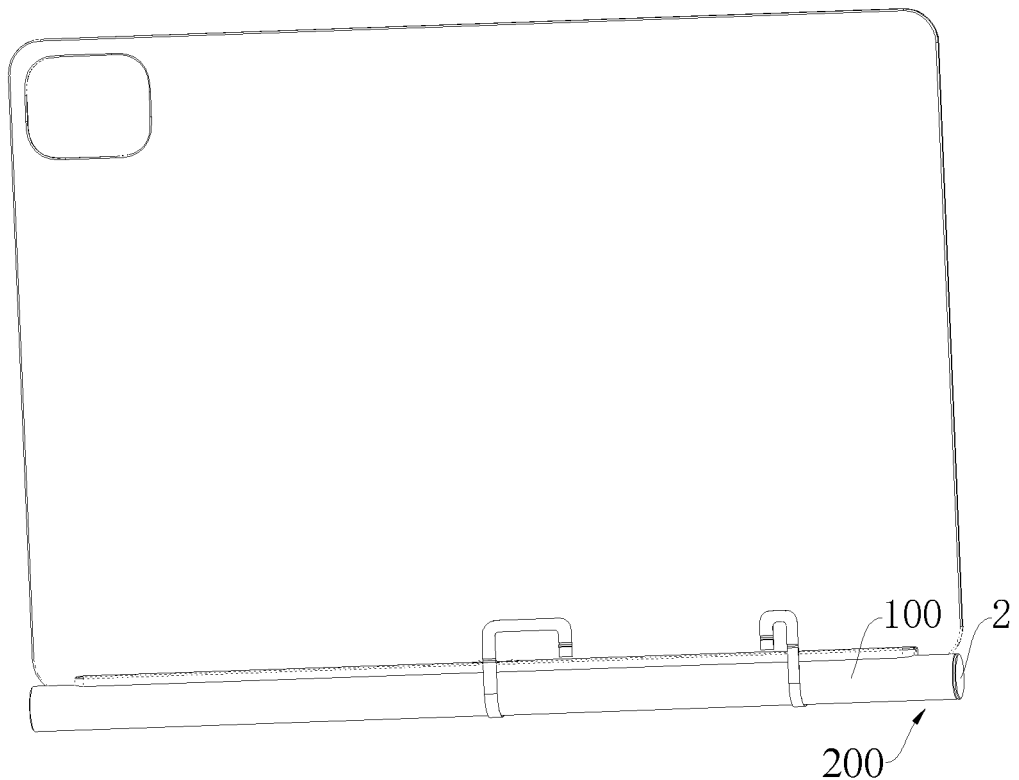
FIG. 3 is a schematic view illustrating that a touch pen of a protective case is in an inserted position in an accommodating cylinder according to an embodiment of the present disclosure.
Figure 4:
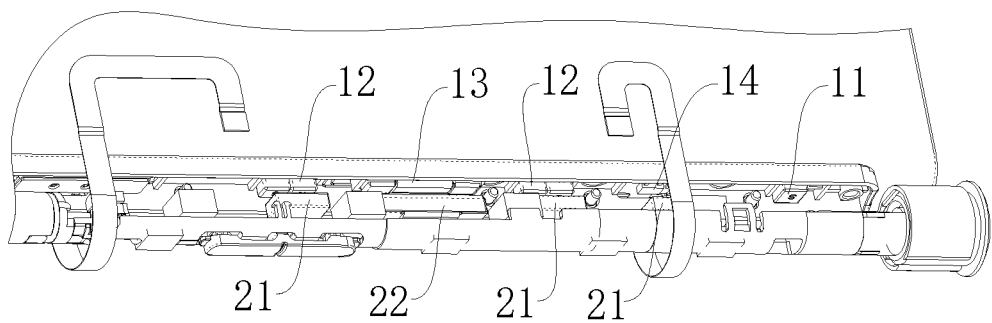
FIG. 4 is a partially enlarged and cutaway view illustrating that a touch pen of a protective case is in an inserted position in an accommodating cylinder according to an embodiment of the present disclosure.
Figure 5:
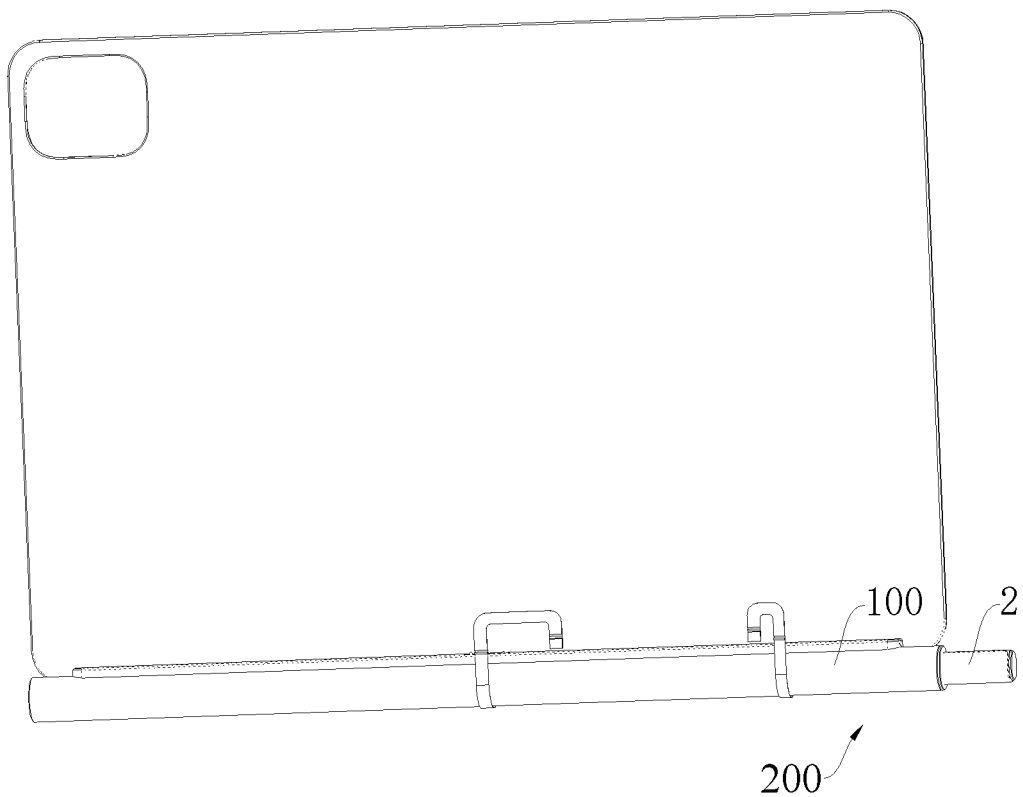
FIG. 5 is a schematic view illustrating that a touch pen of a protective case is in a pop-up position in an accommodating cylinder according to an embodiment of the present disclosure.
Figure 6:
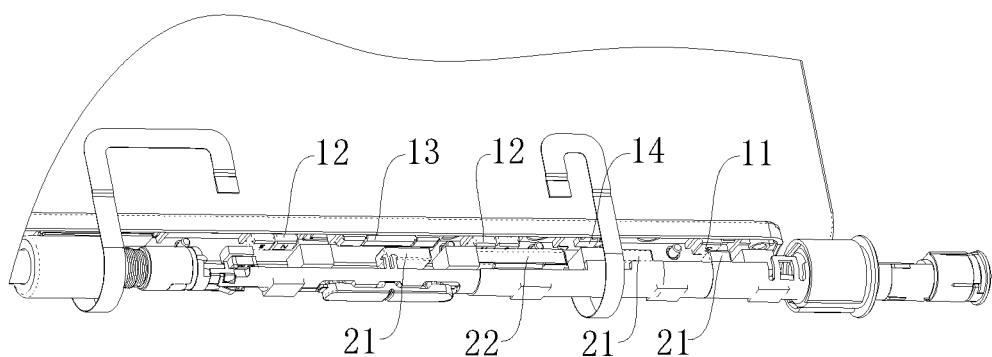
FIG. 6 is a partially enlarged and cutaway view illustrating that a touch pen of a protective case is in a pop-up position in an accommodating cylinder according to an embodiment of the present disclosure.

As illustrated in FIG. 2, the protective case 300 according to the embodiment of the present disclosure includes a support plate 31 and an accommodating cylinder 100. The support plate 31 has a first connecting portion 311 and a second connecting portion 312 both connected with the accommodating cylinder 100. The accommodating cylinder 100 is an accommodating cylinder 100 according to the embodiment of the present disclosure. In some embodiments, the first connecting portion 311 and the second connecting portion 312 may be connected to the accommodating cylinder 100 through a flexible connecting portion 313. Materials of the flexible connecting portion 313 may be Polyurethane (PU).

The protective case 300 according to the embodiment of the present disclosure may be detachably connected with the tablet computer 92 through the first connecting portion 311 and detachably connected with the keyboard 91 through the second connecting portion 312, such that the tablet computer 92, the accommodating cylinder 100 and the keyboard 91 may be used in combination, thereby providing more convenient operations for a user. In addition, since the protective case 300 includes the accommodating cylinder 100 according to the embodiment of the present disclosure, the touch pen 2 can be easily accessed and the safe storage of the touch pen 2 can be achieved.

Thus, the protective case 300 according to the embodiment of the present disclosure has advantages of providing more convenient operations for the user, and enabling the safe storage of the touch pen 2 and the convenient access to the touch pen 2, or the like.

The tablet computer 92 is detachably connected with the first connecting portion 311 of the protective case 300. The keyboard 91 is detachably connected with the second connecting portion 312 of the protective case 300. The tablet computer assembly 900 according to the embodiment of the present disclosure combines the tablet computer 92, the accommodating cylinder 100 and the keyboard 91, which may provide more convenient operations for the user. In addition, since the tablet computer assembly 900 includes the protective case 300 which includes the accommodating cylinder 100, the touch pen 2 can be easily accessed and the safe storage of the touch pen 2 can be achieved.

Therefore, the tablet computer assembly 900 according to the embodiment of the present disclosure has advantages of providing more convenient operations for the user, and enabling the convenient access to the touch pen 2 and the safe storage of the touch pen 2, or the like.

Specifically, as illustrated in FIGS. 1 and 2, the first connecting portion 311 includes a main support plate 3111 and an auxiliary support plate 3112, and an end of the auxiliary support plate 3112 is rotatably connected to the main support plate 3111, such that the auxiliary support plate 3112 may rotate by a predetermined angle relative to the main support plate 3111, so as to achieve a vertical support for the tablet computer 92. Thus, the tablet computer 92 may be placed obliquely on the main support plate 3111, thereby facilitating the user to watch the tablet computer 92.

As illustrated in FIGS. 1, 2, 7 and 8, the accommodating cylinder 100 of the tablet computer assembly 900 according to the embodiment of the present disclosure includes an electrical connector 33 (e.g., a pogo pin). In a use state, the electrical connector 33 is electrically connected with the tablet computer 92 and the keyboard 91. The electrical connector 33 is configured for transmitting data between the tablet computer 92 and the keyboard 91, and also transmitting an external current to supply power to the tablet computer 92. Or, the electrical connector 33 is configured for transmitting data between the tablet computer 92 and the keyboard, and transmitting a current of the tablet computer 92 to supply power to the keyboard 91.

The electrical connector 33 is arranged on the accommodating cylinder 100. When the tablet computer 92 and the keyboard 91 are connected with the protective case 300 for use, it is convenient for a contact on the tablet computer 92 to be in contact with the electrical connector 33 on the accommodating cylinder 100, so as to facilitate the data communication between the tablet computer 92 and the keyboard 91, and to achieve that the tablet computer 92 supplies power to the keyboard 91 or the external power source supplies power to the tablet computer 92.

In some embodiments, the electrical connector 33 is electrically connected to a flexible circuit board 34 in the protective case 300. At least a part of the flexible circuit board 34 is arranged in the flexible connecting portion 313. The flexible circuit board 34 is electrically connected with the keyboard 91 connected to the protective case 300, such that the keyboard 91 can be electrically connected with the electrical connector 33.

Figure 7:
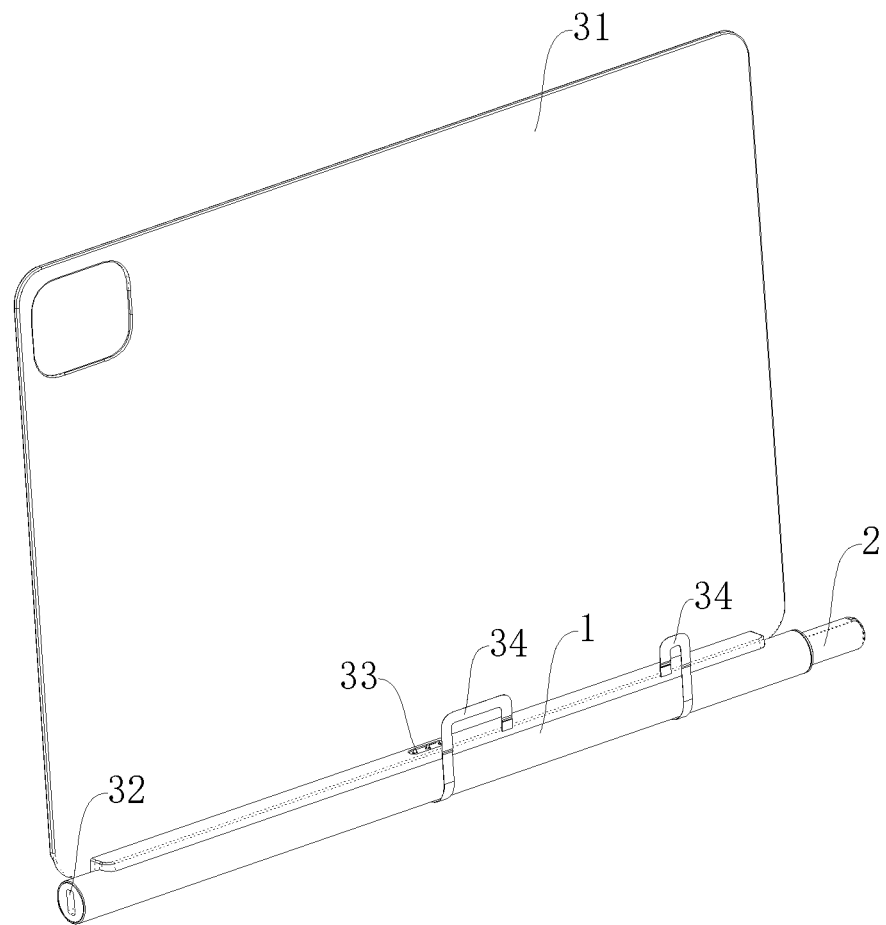
FIG. 7 is a schematic view of a protective case according to an embodiment of the present disclosure.
Figure 8:
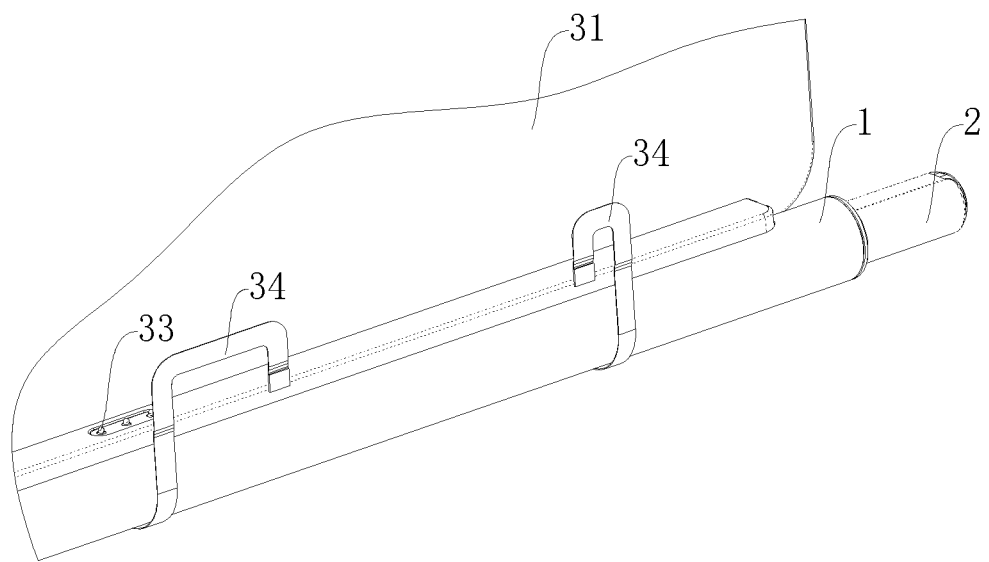
FIG. 8 is a partially enlarged view of the structure in FIG. 7.

As illustrated in FIG. 7, an end of the accommodating cylinder 100 is provided with a charging port (e.g., a USB charging port) 32 configured to be connected with the external power source. The charging port 32 is electrically connected to the electrical connector 33. Thus, when the tablet computer 92 is placed on the protective case 300 for use, the tablet computer 92 is placed on the accommodating cylinder 100 and the first connecting portion 311. Since the charging port 32 is connected with the external power source, and the electrical connector 33 is connected with the contact on the tablet computer 92, the tablet computer 92 can be powered and charged through the charging port 32 and the electrical connector 33. Thus, the convenient charging of the tablet computer 92 can be achieved when the tablet computer 92 is fixed on the protective case 300 for use, and the problem of chaotic and untidy charging lines caused by directly charging the tablet computer 92 when the tablet computer 92 is placed on the protective case 300 for use can be avoided. Further, functions of the protective case 300 can be diversified.

It should be noted that when the tablet computer 92 is charged through the charging port 32, the external power source at the charging port 32 can supply power to the keyboard 91 synchronously.

As illustrated in FIG. 1, the first connecting portion 311 is provided with a sixth magnetic member 301 configured to be attracted with the tablet computer 92. Thus, the tablet computer 92 can be more firmly attracted to the first connecting portion 311. Thus, the tablet computer 92 can be prevented from sliding on the first connecting portion 311. Moreover, the second connecting portion 312 is further provided with a seventh magnetic member (not shown) configured to be attracted with the keyboard 91. Thus, the keyboard 91 can be more firmly connected to the second connecting portion 312.

Figure 9:
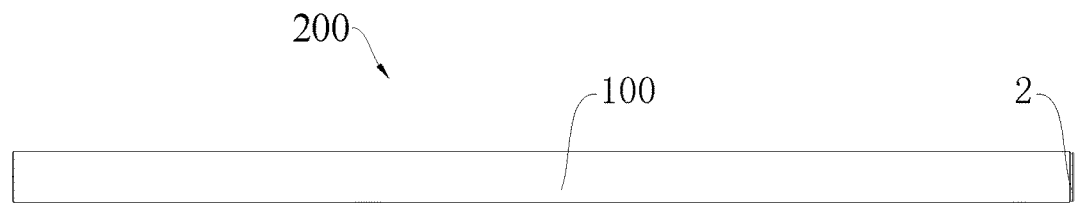
FIG. 9 is a schematic view of a touch pen assembly according to an embodiment of the present disclosure.
Figure 10:
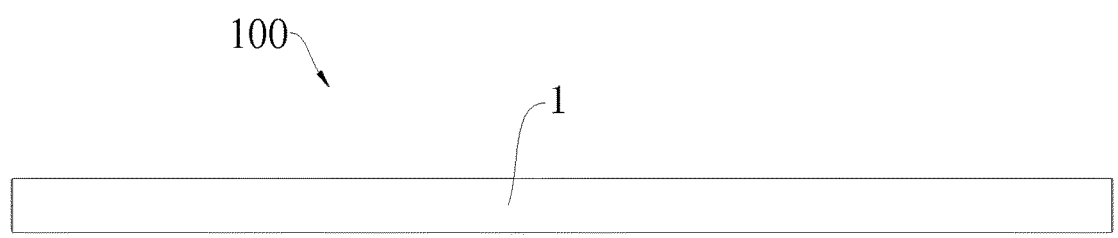
FIG. 10 is a schematic view of an accommodating cylinder according to an embodiment of the present disclosure.

As illustrated in FIG. 9, the touch pen assembly 200 according to an embodiment of the present disclosure includes an accommodating cylinder 100 and a touch pen 2. The accommodating cylinder 100 is the accommodating cylinder 100 according to the embodiment of the present disclosure. The touch pen 2 is detachably fitted with the pen base 5 such that the pen base 5 may drive the touch pen 2 to move, and the touch pen 2 may also be separated from the pen base 2 under action of an external force. A part of the touch pen 2 in the pop-up position extends out of the accommodating cavity, such that the touch pen 2 can be easily taken out from the accommodating cylinder 100.

When the touch pen 2 is connected with the pen base 5 in the inserted position, by supplying the current to the coil, the second magnetic member may achieve that the pen base 5 and the touch pen 2 are automatically transferred from the inserted position to the pop-up position, under the action of the first magnetic field generated by the first magnetic member, so that it is convenient to take out the touch pen 2.

Since the touch pen 2 can be automatically transferred from the inserted position to the pop-up position, the part of the touch pen 2 exposed out of the accommodating cavity can be reduced or the touch pen 2 can be completely located in the accommodating cavity, in the inserted position. Thus, the risk that the touch pen 2 drops caused by being mistakenly touched can be avoided, so as to achieve the safe storage of the touch pen 2.

Thus, the touch pen assembly 200 according to the embodiment of the present disclosure has advantages of the safe storage of the touch pen 2 and the convenient access to the touch pen 2, or the like.

In some embodiments, the pen base 5 is provided with an elastic portion (not shown), the elastic portion is provided with an insertion hole, and the touch pen 2 is detachably fitted in the insertion hole. For example, a soft glue is provided at a part of the pen base 5 that is in contact with the touch pen 2, so as to provide a wrapping force for the touch pen 2. It is convenient to arrange the soft glue in the pen base 5, and a relatively large wrapping force can be applied to the touch pen 2, so as to provide a large friction force to the touch pen 2, thereby facilitating the pen base 5 to drive the touch pen 2 to move.

As illustrated in FIGS. 3 to 6, the touch pen 2 further includes a third magnetic member 21. The accommodating cylinder 100 further includes a fourth magnetic member 11 and a fifth magnetic member 12. When the touch pen 2 is in the pop-up position, the third magnetic member 21 and the fourth magnetic member 11 are attracted with each other. When the touch pen 2 is in the inserted position, the third magnetic member 21 and the fifth magnetic member 12 are attracted with each other.

In pop-up structures of pens in the related art, after the pen is popped up, the user needs to hold the pen in time, otherwise the pen will fall in certain cases, thereby resulting in damage to the pen.

In the touch pen assembly 200 according to the embodiment of the present disclosure, since the third magnetic member 21 of the touch pen 2 in the pop-up position is attracted with the fourth magnetic member 11 of the accommodating cylinder 100, the touch pen 2 in the pop-up position can be prevented from dropping. That is, the fourth magnetic member 11 will attract the touch pen 2, even if the user does not hold the pen in time after the touch pen 2 is popped up. Thus, even if the accommodating cylinder 100 (the touch pen 2) tilts or the touch pen 2 is touched by mistake, the touch pen 2 will not fall out, so as to achieve the safe storage of the touch pen 2. In addition, since the third magnetic member 21 of the touch pen 2 in the inserted position is attracted with the fifth magnetic member 12, the touch pen 2 in the inserted position can be firmly connected with the accommodating cylinder 100, such that the touch pen assembly 200 can achieve the safe storage of the touch pen 2 in any scenarios and it is convenient to move and carry the touch pen assembly 200.

Specifically, as illustrated in FIGS. 3 to 6, each of the third magnetic member 21, the fourth magnetic member 11 and the fifth magnetic member 12 is a magnet. Thus, the attraction among the magnets may provide a stronger attraction force, such that the touch pen 2 can be more firmly attracted in the accommodating cavity of the accommodating cylinder 100, so as to be prevented from dropping.

In addition, according to specific structures of the accommodating cylinder 100 and the touch pen 2, there may be three third magnetic members 21 according to the embodiment, and the three third magnetic members 21 are spaced apart from each other in the touch pen 2. There may be two fifth magnetic members 12 spaced apart from each other on the cylinder body 1. The touch pen 2 in the pop-up position is attracted with the fourth magnetic member 11 through one fourth magnetic member 11. The touch pen 2 in the inserted position can be attracted with two fifth magnetic members 12 through two third magnetic members 21 in one-to-one correspondence.

Thus, the touch pen 2 in the pop-up position can be attracted in the accommodating cavity through a pair of magnets, and the touch pen 2 in the inserted position can be attracted in the accommodating cavity through two pairs of magnets, such that the attraction force between the touch pen 2 in the inserted position and the accommodating cylinder 100 may be greater, and the touch pen 2 in the inserted position can be firmly connected in the accommodating cylinder 100, thereby facilitating the movement and transportation of the touch pen assembly 200. Furthermore, since the attraction force between the touch pen 2 in the pop-up position and the accommodating cylinder 100 is relatively small, the touch pen 2 can be prevented from falling out of the accommodating cylinder 100, and also it is convenient for the user to take out the touch pen 2.

As illustrated in FIGS. 3 to 6, the accommodating cylinder 100 further includes a charging transmitting module 13. When the touch pen 2 is in the inserted position, the charging transmitting module 13 is fitted with a charging receiving module 22 of the touch pen 2 to charge the touch pen 2. Thus, the touch pen assembly 200 may have the function of charging the touch pen 2.

As illustrated in FIGS. 3 to 6, the accommodating cylinder 100 further includes a Hall switch 14. The Hall switch 14 is configured to detect a position state of the touch pen 2 and control the charging transmitting module 13 to be switched on or off according to a detected result.

For example, when the touch pen 2 is in the inserted position, a N pole of one of the third magnetic members 21 of the touch pen 2 is directly opposite to the Hall switch 14 in a radial direction of the touch pen 2, and a magnetic flux of the third magnetic member 21 reaches a sensing threshold of the Hall switch 14, so that the Hall switch 14 is triggered. In this case, the Hall switch 14 controls the charging transmitting module 13 to be switched on, such that the charging transmitting module 13 charges the touch pen 2. That is, as long as the touch pen 2 is in the inserted position in the accommodating cavity and the power of the touch pen 2 is insufficient, the accommodating cylinder 100 can charge the touch pen 2.

When the touch pen 2 is in the pop-up position, the N pole of this third magnetic member 21 of the touch pen 2 is staggered with the Hall switch 14 in the radial direction of the touch pen 2, and the magnetic flux of the third magnetic member 21 does not reach the sensing threshold of the Hall switch 14, so that the Hall switch 14 is switched off, i.e. not triggered. In this case, the Hall switch 14 controls the charging transmitting module 13 to be switched off, such that the charging transmitting module 13 cannot charge the touch pen 2.

The touch pen assembly 200 according to the embodiment of the present disclosure controls the charging transmitting module 13 to charge the touch pen 2 or not through the Hall switch 14, so as to prevent the charging transmitting module 13 from being in a standby state all the time, thereby reducing the power consumption of the charging transmitting module 13.

Specifically, as illustrated in FIGS. 3 to 6, this third magnetic member 21 of the touch pen 2 in this embodiment may be fitted with the Hall switch 14 when the touch pen 2 is in the inserted position, and also may be attracted with the fourth magnetic member 1 when the touch pen 2 is in the pop-up position. Thus, the number of magnetic members arranged in the touch pen 2 can be reduced and the structure of the touch pen 2 is simpler.

In some embodiments, the tablet computer 92 is provided with an eighth magnetic member (not shown) configured to be fitted with the fourth magnetic member 11 and/or the fifth magnetic member 12. Thus, when the tablet computer 92 is supported on the accommodating cylinder 100, the fourth magnetic member 11 and/or the fifth magnetic member 12 may provide a magnetic attraction to the tablet computer 92, such that the tablet computer 92 can be more stably supported on the accommodating cylinder 100.

An embodiment of an accommodating cylinder according to the present disclosure is described in detail below with reference to FIGS. 10-13.

As illustrated in FIGS. 10 to 13, the accommodating cylinder 100 according to the embodiment of the present disclosure includes a cylinder body 1, a first magnetic member 74, a second magnetic member 73 and a pen base 5. The cylinder body 1 has an accommodating cavity (not shown). The first magnetic member 74 is configured to generate a first magnetic field, and is arranged in the accommodating cavity. The second magnetic member 73 is a coil, and is arranged in the accommodating cavity and movable between a retracted position and an extended position.

In order to facilitate an easy understanding of the technical solution of the present disclosure, the following description is made by taking the second magnetic member 73 movable between the retracted position and the extended position along a left-right direction as an example. The left-right direction is shown by an arrow A in FIGS. 12 and 13. The second magnetic member 73 may move rightwards from the retracted position to the extended position, and move leftwards from the extended position to the retracted position.

Figure 11:
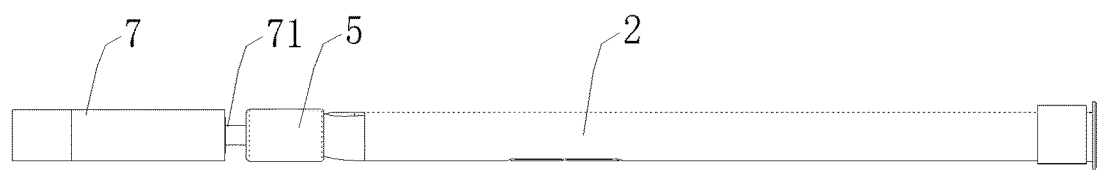
FIG. 11 is a schematic view of an accommodating cylinder fitted with a touch pen according to an embodiment of the present disclosure, in which a cylinder body of the accommodating cylinder is hidden.
Figure 12:
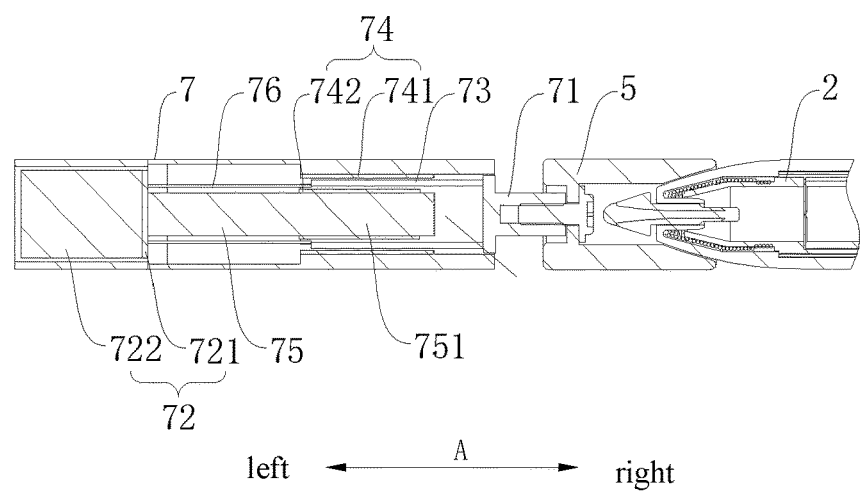
FIG. 12 is a partial sectional view of the structure in FIG. 11.
Figure 13:
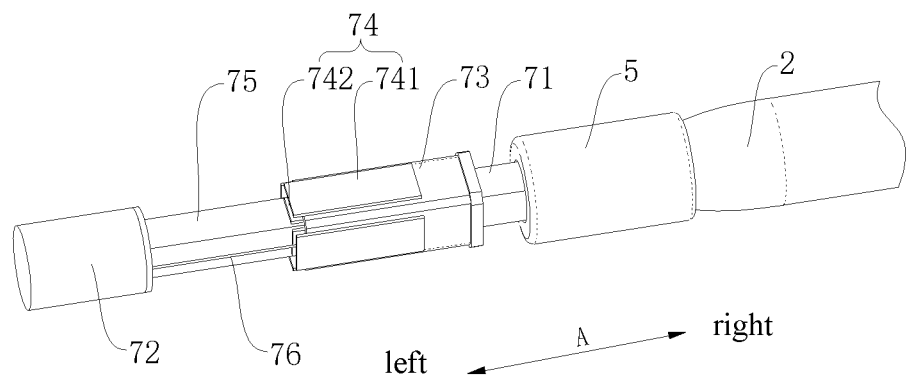
FIG. 13 is a perspective view of the structure in FIG. 12, in which a fixed tube is hidden.

The pen base 5 is connected to the second magnetic member 73. For example, a left end of the pen base 5 is connected to a support member on which the second magnetic member (coil) 73 is wound. Specifically, as illustrated in FIGS. 11 to 13, the accommodating cylinder 100 according to the embodiment of the present disclosure further includes a movable rod 71, a first end (e.g., a left end) of the movable rod 71 is connected with the second magnetic member 73, and a second end (e.g., a right end) of the movable rod 71 is connected with the pen base 5. Thus, it is convenient to achieve the connection between the pen base 5 and the second magnetic member 73. In some embodiments, a left end of the pen base 5 is connected with the movable rod 71 through a fastener, which is convenient for connection.

In a first power-on state, that is, when a current is supplied to the second magnetic member 73, the second magnetic member 73 is subject to an ampere force in the first magnetic field generated by the first magnetic member 74, the ampere force enables the second magnetic member 73 to move rightwards relative to the first magnetic member 74, so as to move from the retracted position to the extended position, and the second magnetic member 73 drives the pen base 5 to move from the inserted position to the pop-up position.

In a second power-on state, that is, when an opposite current is supplied to the second magnetic member 73, the second magnetic member 73 is subject to an ampere force in the first magnetic field generated by the first magnetic member 74, the ampere force enables the second magnetic member 73 to move leftwards relative to the first magnetic member 74, so as to move from the extended position to the retracted position.

That is, a direction of the current supplied to the second magnetic member 73 is changed such that a direction of the ampere force applied to the second magnetic member 73 may be changed, and then a movement direction of the second magnetic member 73 in the accommodating cavity may be changed. Thus, the second magnetic member 73 may be moved between the retracted position and the extended position.

It should be noted that a left end of the cylinder body 1 is closed and a right end of the cylinder body 1 is open, such that the touch pen 2 may be pulled out from the right end of the cylinder body 1.

As illustrated in FIGS. 12 and 13, the first magnetic member 74 is arranged in the accommodating cavity. The first magnetic member 74 includes an inner magnetic member 742 and an outer magnetic member 741. A first magnetic pole of the inner magnetic member 742 is arranged opposite to a first magnetic pole of the outer magnetic member 741, and the polarity of the first magnetic pole of the inner magnetic member 742 is opposite to that of the first magnetic pole of the outer magnetic member 741. The second magnetic member 73 is wound between the first magnetic pole of the inner magnetic member 742 and the first magnetic pole of the outer magnetic member 741. Thus, it is convenient to generate the first magnetic field between the first magnetic pole of the inner magnetic member 742 and the first magnetic pole of the outer magnetic member 741, and the second magnetic member 73 is wound in the first magnetic field. Therefore, it is convenient for the second magnetic member 73 to be subject to the ampere force so as to push the pen base 5 and the touch pen 2 to move.

As illustrated in FIGS. 11 to 13, the accommodating cylinder 100 according to the embodiment of the present disclosure further includes a cantilever shaft 75 arranged in the cylinder body 1. The outer magnetic member 741 is arranged on an inner peripheral surface of the cylinder body 1. The inner magnetic member 742 is arranged on an outer peripheral surface of at least a part 751 of the cantilever shaft 75. Thus, the outer magnetic member 741 and the inner magnetic member 742 can be stably and reliably mounted in the accommodating cavity.

In some embodiments, as illustrated in FIGS. 11 to 13, the accommodating cylinder 100 according to the embodiment of the present disclosure further includes a fixed tube 7 arranged in the accommodating cavity, and each of an axis direction of the fixed tube 7 and an axis direction of the cylinder body 1 is the left-right direction. The outer magnetic member 741 is arranged on an inner peripheral surface of the fixed tube 7. The least part 751 of the cantilever shaft 75 extends into the fixed tube 7. The inner magnetic member 742 is arranged on the outer peripheral surface of the at least part 751 of the cantilever shaft 75. Thus, the outer magnetic member 741 may be first mounted in the fixed tube 7, and then the outer magnetic member 741 and the fixed tube 7 may be mounted in the accommodating cavity as a whole, so as to facilitate the assembling.

The fixed tube 7 is arranged in the accommodating cavity, and a right end face of the fixed tube 7 also facilitates the limiting of the pen base 5, such that the pen base 5 can have a stable retracted position. In addition, a part of the movable rod 71 is slidably connected in the fixed tube 7 so that it is convenient for the fixed tube 7 to guide the movable rod 71.

As illustrated in FIGS. 12 and 13, there are a plurality of outer magnetic members 741 spaced apart from each other on the inner peripheral surface of the cylinder body 1 along a circumferential direction of the cylinder body 1. There are a plurality of inner magnetic members 742 spaced apart from each other on the outer peripheral surface of the cantilever shaft 75 along a circumferential direction of the cantilever shaft 75. The plurality of outer magnetic members 741 and the plurality of inner magnetic members 742 are in one-to-one correspondence in an inner-outer direction. Thus, the first magnetic member 74 can provide a stronger magnetic field and the second magnetic member 73 can be subject to a larger ampere force, such that it is easier for the second magnetic member 73 to drive the pen base 5 and the touch pen 2 to move in the accommodating cavity.

Shapes of the second magnetic member 73, the inner peripheral surface of the fixed tube 7 and the outer peripheral surface of the cantilever shaft 75 are adapted to each other. For example, the shape of the second magnetic member 73, the shape of the inner peripheral surface of the fixed tube 7 and the shape of the outer peripheral surface of the cantilever shaft 75 in the embodiment of the present disclosure are all a quadrangular prism. In this way, the space of the magnetic field formed between the inner magnetic member 742 and the outer magnetic member 741 can be maximally utilized, and thus the second magnetic member 73 with more turns can be arranged in the first magnetic field within a certain space, such that the second magnetic member 73 is subject to a larger ampere force, and hence it is easier for the second magnetic member 73 to drive the pen base 5 and the touch pen 2 to move in the accommodating cavity.

As illustrated in FIGS. 11 to 13, the accommodating cylinder 100 according to the embodiment of the present disclosure further includes a power supply member 72. The power supply member 72 is arranged in the accommodating cavity. The power supply member 72 is electrically connected with the second magnetic member 73 to switchably provide one of a first current and a second current to the second magnetic member 73. A direction of the first current is opposite to that of the second current. Thus, it is convenient to provide currents in opposite directions to the second magnetic member 73, respectively. The power supply member 72 includes a power supply switch (not shown), and the power supply switch is configured to control the coil (the second magnetic member 73) to be in a power-off state, the first power-on state or the second power-on state.

When the accommodating cylinder 100 cooperates with the tablet computer 92 for use, the power supply member 72 may include a circuit element for adjusting a magnitude of an external input current. The power supply switch may be a mini program running on the tablet computer that controls the circuit element.

Of course, the power supply member 72 may further include a power source element such as a battery 722. As illustrated in FIG. 12, the power supply member 72 includes a battery 722 and a circuit board 721 (e.g., a PCB board). The battery 722 is connected to an end of the circuit board 721. The cantilever shaft 75 is connected to another end of the circuit board 721. The circuit board 721 is connected to the second magnetic member 73 through a wavy wire 76 such that the second magnetic member 73 will not pull the circuit board 721 to move when moving between the retracted position and the extended position. Through the circuit board 721, the direction and magnitude of the current supplied to the second magnetic member 73 may be changed, and thus the current supplied by the battery 722 to the second magnetic member 73 can meet use requirements of the second magnetic member 73. When the power supply member 72 includes the battery 722, the power supply switch may be a physical switch arranged at a certain position of the cylinder body 1.

Another embodiment of an accommodating cylinder according to an embodiment of the present disclosure is described in detail below with reference to FIGS. 10, 14-16.

As illustrated in FIGS. 10, 14 to 16, the accommodating cylinder 100 according to the embodiment of the present disclosure includes a cylinder body 1, a first magnetic member 85, a second magnetic member 83 and a pen base 5. The cylinder body 1 has an accommodating cavity. The first magnetic member 85 is a coil arranged in the accommodating cavity. The second magnetic member 83 is arranged in the accommodating cavity and movable between a retracted position and an extended position.

In order to facilitate an easy understanding of the technical solution of the present disclosure, the following description is made by taking the second magnetic member 83 movable between the retracted position and the extended position along a left-right direction as an example. The left-right direction is shown by an arrow A in FIGS. 15 and 16. The second magnetic member 83 may move rightwards from the retracted position to the extended position, and also may move leftwards from the extended position to the retracted position.

Figure 14:
FIG. 14 is another schematic view of an accommodating cylinder fitted with a touch pen according to an embodiment of the present disclosure, in which a cylinder body of the accommodating cylinder is hidden.
Figure 15:
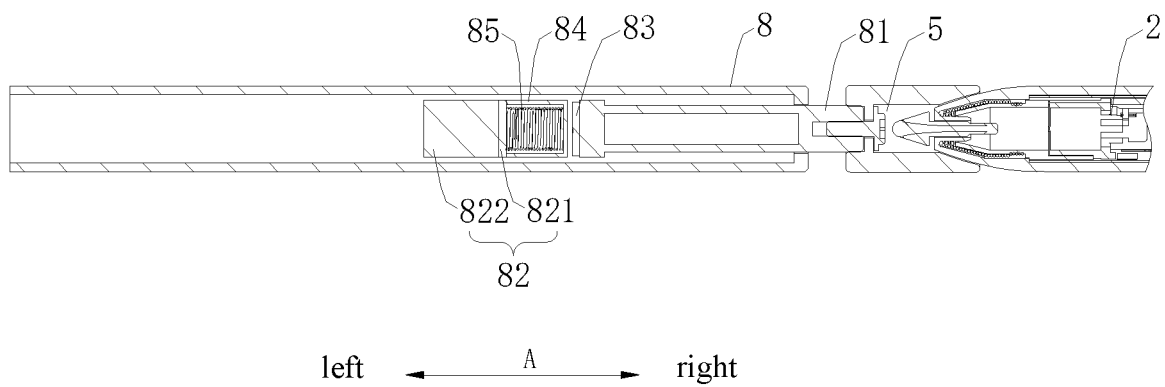
FIG. 15 is a partially sectional view of the structure in FIG. 14.
Figure 16:
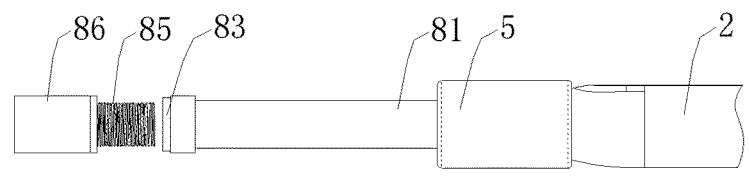
FIG. 16 is a perspective view of FIG. 15, in which a fixed tube and a protective shell are hidden.
Figure 17:
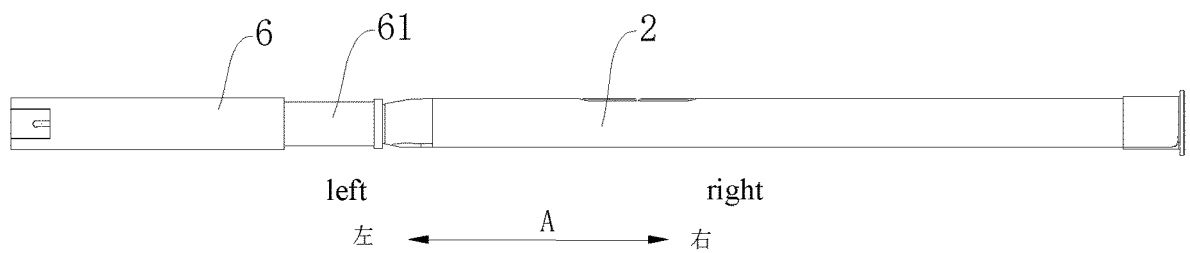
FIG. 17 is a schematic view of an accommodating cylinder fitted with a touch pen in a pop-up position according to an embodiment of the present disclosure, in which a cylinder body of the accommodating cylinder is hidden.

The pen base 5 is connected to the second magnetic member 83. Specifically, as illustrated in FIGS. 14 to 16, the accommodating cylinder 100 according to the embodiment of the present disclosure further includes a movable rod 81, a first end (e.g., a left end) of the movable rod 81 is connected with the second magnetic member 83, and a second end (e.g., a right end) of the movable rod 81 may be connected with the pen base 5. Thus, it is convenient to achieve the connection between the pen base 5 and the second magnetic member 83. In some embodiments, a left end of the pen base 5 is connected with the movable rod 81 through a fastener, which is convenient for connection.

In some embodiments, an interior of the movable rod 81 is configured as a hollow structure, so as to reduce the weight of the accommodating cylinder 100. Thus, the accommodating cylinder 100 can be carried easily.

In a first power-on state, that is, when a current is supplied to the first magnetic member 85, the second magnetic member 83 is subject to a repulsive force in the first magnetic field generated by the first magnetic member 85, the repulsive force enables the second magnetic member 83 to move rightwards relative to the first magnetic member 85, so as to move from the retracted position to the extended position, and the second magnetic member 83 drives the pen base 5 to move from the inserted position to the pop-up position.

In a second power-on state, that is, when an opposite current is supplied to the first magnetic member 85, the second magnetic member 83 is subject to an attraction force in the first magnetic field generated by the first magnetic member 85, and the attraction force enables the second magnetic member 83 to move leftwards relative to the first magnetic member 85, so as to move from the extended position to the retracted position.

That is, a direction of the current supplied into the second magnetic member 83 is changed such that a direction of the force applied to the second magnetic member 83 may be changed, and then a movement direction of the second magnetic member 83 in the accommodating cavity may be changed. Thus, the second magnetic member 83 may be moved between the retracted position and the extended position.

It should be noted that a left end of the cylinder body 1 is closed and a right end of the cylinder body 1 is open, such that the touch pen may be pulled out from the right end of the cylinder body 1.

As illustrated in FIGS. 10, 14 to 16, the accommodating cylinder 100 according to the embodiment of the present disclosure further includes a fixed tube 8 arranged in the accommodating cavity, and each of an axis direction of the cylinder body 1 and an axis direction of the fixed tube 8 is the left-right direction. The first magnetic member 85 is arranged in the fixed tube 8, and the second magnetic member 83 is arranged in the fixed tube 8 and movable between the retracted position and the extended position. A part of the movable rod 81 is movably arranged in the fixed tube 8 such that a first end of the movable rod 81 is connected with the second magnetic member 83, and the fixed tube 8 may also guide the movable rod 81. In other words, the movable rod 81 is arranged movably relative to the fixed tube 8, and a part of the movable rod 81 is located in the fixed tube 8. Thus, the first magnetic member 85, the second magnetic member 83 and the movable rod 81 may be mounted in the fixed tube 8 first, and then the first magnetic member 85, the second magnetic member 83, the movable rod 81 and the fixed tube 8 may be mounted in the accommodating cavity as a whole, so as to facilitate the assembling. In addition, the fixed tube 8 is arranged in the accommodating cavity, and an end face of the fixed tube 8 also facilitates the limiting of the pen base 5.

In some embodiments, the second magnetic member 83 is a magnet. Thus, on one hand, the magnet has strong magnetism such that the attraction and repulsive forces applied to the second magnetic member 83 are enough to push the pen base 5 and the touch pen 2 to move. On the other hand, the magnet does not need to be powered on to generate magnetism, so as to reduce energy consumption.

As illustrated in FIGS. 14 to 16, the accommodating cylinder 100 according to the embodiment of the present disclosure further includes a power supply member 82. The power supply member 82 is arranged in the accommodating cavity. The power supply member 82 is electrically connected with the first magnetic member 85 to switchably provide one of a first current and a second current to the first magnetic member 85. A direction of the first current is opposite to that of the second current. Thus, it is convenient to provide currents in opposite directions to the coil such that the first magnetic member 85 can generate two first magnetic fields with opposite polarities, respectively. The power supply member 82 includes a power supply switch (not shown), and the power supply switch is configured to control the first magnetic member 85 to be in a power-off state, the first power-on state or the second power-on state.

When the accommodating cylinder 100 is fitted with the tablet computer 92 for use, the power supply member 82 may include a circuit element for adjusting a magnitude of an external input current. The power supply switch may be a mini program running on the tablet computer 92 that controls the circuit element.

Of course, the power supply member 82 may further include a power source element such as a battery 882. As illustrated in FIGS. 15 and 16, the power supply member 82 includes a battery 882 and a circuit board 821 (e.g., a PCB board). The battery 822 is connected to an end of the circuit board 821, and the coil is connected to another end of the circuit board 821. Thus, through the circuit board 821, the direction and magnitude of the current supplied to the coil may be changed, and thus the current supplied by the battery 882 to the coil may meet use requirements of the coil. When the power supply member 82 includes the battery 882, the power supply switch may be a physical switch arranged at a certain position of the cylinder body 1.

As illustrated in FIG. 15, the accommodating cylinder 100 according to the embodiment of the present disclosure further includes a protective shell 84 arranged on the circuit board 821, a protective cavity is defined between the protective shell 84 and the circuit board 821, and the coil is arranged in the protective cavity, so as to provide a mounting space with a certain stiffness for the coil, thereby facilitating the mounting of the coil, and avoiding the coil from being compressed and deformed to affect the magnetic field generated in the coil.

As illustrated in FIGS. 17 to 24, the accommodating cylinder 100 includes a cylinder body 1, an elastic member 62, a pen base 61 and a limiting portion. The cylinder body 1 has an accommodating cavity (not shown), and the accommodating cavity has an input and output opening of the touch pen, through which the touch pen 2 may be insert into and pulled out of the accommodating cavity. The elastic member 62 is arranged on the cylinder body 1 and connected with the pen base 61.

An annular sliding groove 612 is formed in an outer peripheral surface of the pen base 61, and has an extension point and a retraction point, and the extension point is adjacent to the input and output opening for the touch pen relative to the retraction point. When the pen base 61 is in the pop-up position, the limiting portion is located at the extension point of the annular sliding groove 612. When the pen base 61 is in the inserted position, the limiting portion is located at the retraction point of the annular sliding groove 612. The limiting portion is connected with the cylinder 1 and fitted in the annular sliding groove 612. The pen base 61 includes a stop portion 615. When the pen base 61 is in the inserted position, the stop portion 615 stops the limiting portion to prevent the limiting portion from sliding to the extension point of the annular sliding groove 612, and the elastic member 62 is in a deformed state to normally push the pen base 61 towards the pop-up position.

In the related art, an accommodating portion for accommodating the touch pen is arranged on the tablet computer or the keyboard associated with the tablet computer. When the touch pen is placed in the accommodating portion, the accommodating portion cannot pop up the touch pen automatically, resulting in an inconvenient access to the touch pen. Or, when the touch pen is placed in the accommodating portion, a part of the touch pen exposed out of the accommodating portion is too much. Although the access to the touch pen is convenient, the risk that the touch pen drops caused by being mistakenly touched still exists.

When the accommodating cylinder 100 according to the embodiment of the present disclosure is in use, the stop portion 615 stops the limiting portion when the pen base 61 is in the inserted position, such that the limiting portion and the annular sliding groove 612 of the pen base 61 cannot move relative to each other. In this way, the pen base 61 may stay in the inserted position, and thus the touch pen 2 connected to (placed on) the pen base 61 may also stay in the inserted position, that is, the touch pen 2 is placed in the accommodating cavity of the accommodating cylinder 100.

When the touch pen 2 is to be taken out, an external force may be applied to the stop portion 615 such that the stop portion 615 does not stop the limiting portion any more, and thus the limiting portion does not stop the pen base 61 anymore. Since the elastic member 62 is in the deformed state to normally push the pen base 61 towards the pop-up position, the pen base 61 will move from the inserted position to the pop-up position under an action of an elastic force of the elastic member 62. In this case, the pen base 61 is in the pop-up position, and due to the action of the elastic member 62, the pen base 61 cannot automatically move from the pop-up position to the inserted position.

It may be understood that when the touch pen is connected with the pen base 61 in the inserted position, by applying the external force to the stop portion 615, the pen base 61 can transfer the touch pen 2 from the inserted position to the pop-up position under the action of the elastic force of the elastic member 62, so as to facilitate the access to the touch pen, that is, it is convenient to take the touch pen out. Since the touch pen 2 may be transferred from the inserted position to the pop-up position, the part of the touch pen 2 exposed out of the accommodating cavity can be reduced or the touch pen 2 can be completely located in the accommodating cavity. Thus, the risk that the touch pen 2 drops caused by being mistakenly touched can be avoided, so as to further achieve the safe storage of the touch pen 2.

When the touch pen 2 is connected with the pen base 61 in the pop-up position, the pen base 61 and the touch pen 2 may be moved from the pop-up position to the inserted position by pressing the pen base 61 with the touch pen 2.

Thus, the accommodating cylinder 100 according to the embodiment of the present disclosure has advantages of the convenient access to the touch pen 2 and the safe storage of the touch pen 2, or the like.

Accordingly, the tablet computer assembly according to the embodiment of the present disclosure has advantages of providing more convenient operations for the user, and enabling the convenient access to the touch pen 2 and the safe storage of the touch pen 2, or the like.

The touch pen assembly 200 according to an embodiment of the present disclosure includes an accommodating cylinder 100 and a touch pen 2. The touch pen 2 is detachably connected to a pen base 61. The touch pen 2 is arranged to be movable along with the pen base 61 between the inserted position and the pop-up position.

In the touch pen assembly 200 according to the embodiment of the present disclosure, the touch pen 2 is detachably connected in the accommodating cylinder 100. When the touch pen 2 is connected with the pen base 61 in the inserted position, the pen base 61 and the touch pen 2 may be transferred from the inserted position to the pop-up position by pressing the touch pen 2, so as to facilitate the access to the touch pen. Since the touch pen 2 may be transferred from the inserted position to the pop-up position automatically, the part of the touch pen 2 exposed out of the accommodating cavity can be reduced or the touch pen 2 cam be completely located in the accommodating cavity. Thus, the risk that the touch pen 2 drops caused by being mistakenly touched can be avoided, so as to further achieve the safe storage of the touch pen 2.

When the touch pen 2 is connected with the pen base 61 in the pop-up position, the pen base 61 and the touch pen 2 may be automatically pushed from the pop-up position back to the inserted position by pressing the touch pen 2.

At least a part of the touch pen 2 in the inserted position is located in the accommodating cavity, and a part of the touch pen 2 in the pop-up position extends out of the accommodating cavity. In other words, the touch pen 2 in the inserted position may be completely located in the accommodating cavity or only a part of the touch pen 2 in the inserted position extends out of the accommodating cavity. Thus, it is possible to avoid the risk of mistakenly touching the touch pen 2 and dropping the touch pen 2 when the touch pen 2 in the inserted position extends too much out of the accommodating cavity, thereby enabling the safe storage of the touch pen 2. Moreover, the part of the touch pen 2 extending out of the accommodating cavity in the pop-up position is more than that in the inserted position, so as to facilitate the access to the touch pen.

Thus, the touch pen assembly 200 according to the embodiment of the present disclosure has advantages of the safe storage of the touch pen 2 and the convenient access to the touch pen 2, or the like.

In some embodiments, the pen base 61 is provided with an elastic portion (not shown), the elastic portion is provided with an insertion hole, and the touch pen 2 is be detachably fitted in the insertion hole. For example, a soft glue is provided at a part of the pen base 61 that is in contact with the touch pen 2, so as to provide a wrapping force for the touch pen 2. It is convenient to arrange the soft glue in the pen base 61, and a relatively large wrapping force can be applied to the touch pen, so as to provide a large friction force to the touch pen, thereby facilitating the pen base 61 to drive the touch pen 2 to move from the pop-up position to the inserted position.

In order to facilitate an easy understanding of the technical solution of the present disclosure, the following description is made by taking a preset direction being a left-right direction as an example. The left-right direction is illustrated by an arrow Ain FIGS. 17-24. The pen base 61 may move rightwards from the inserted position to the pop-up position, and also may move leftwards from the pop-up position to the inserted position.

A left end face of the cylinder body 1 is provided with a USB charging port 32, and a right end of the cylinder body 1 is open to form the input and output opening for the touch pen, so that the touch pen may be inserted into and pulled out of the accommodating cavity through the input-output opening.

The elastic member 62 is located on a left side of the pen base 61, a right end of the elastic member 62 is connected with the pen base 61, and the elastic member 62 may be a spring in a compressed state.

The pen base 61 is arranged in the accommodating cavity and movable between the inserted position and the pop-up position along the left-right direction, such that the touch pen 2 connected with the pen base 61 may move between the inserted position and the pop-up position. An annular sliding groove 612 is formed in an outer peripheral surface of the pen base 61, and has an extension section 6121 and a retraction section 6122. A first end 61211 (a right end) of the extension section 6121 is adjacent to the input-output opening for the touch pen relative to a second end 61212 (a left end) of the extension section 6121 along the left-right direction. A third end 61221 (a right end) of the retraction section 6122 is adjacent to the input-output opening for the touch pen relative to a fourth end 61222 (a left end) of the retraction section 6122 along the left-right direction. The second end 61212 and the fourth end 61222 are communicated with each other at the extension point.

Figure 18:
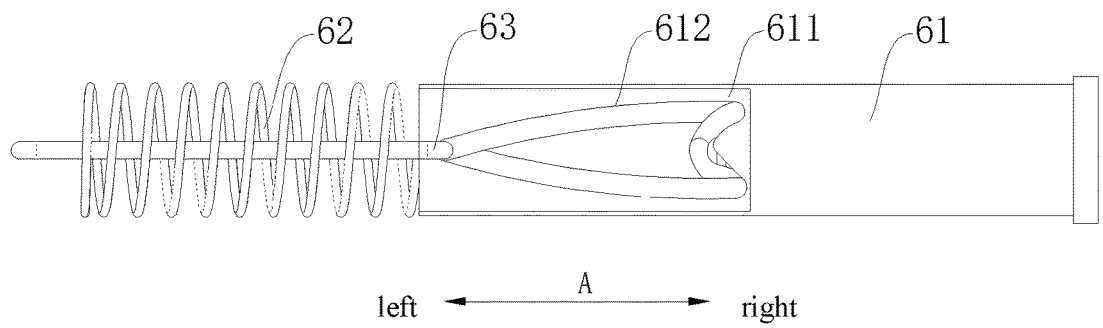
FIG. 18 is a schematic view of the accommodating cylinder in FIG. 17, in which the cylinder body and a fixed tube of the accommodating cylinder are hidden.
Figure 19:
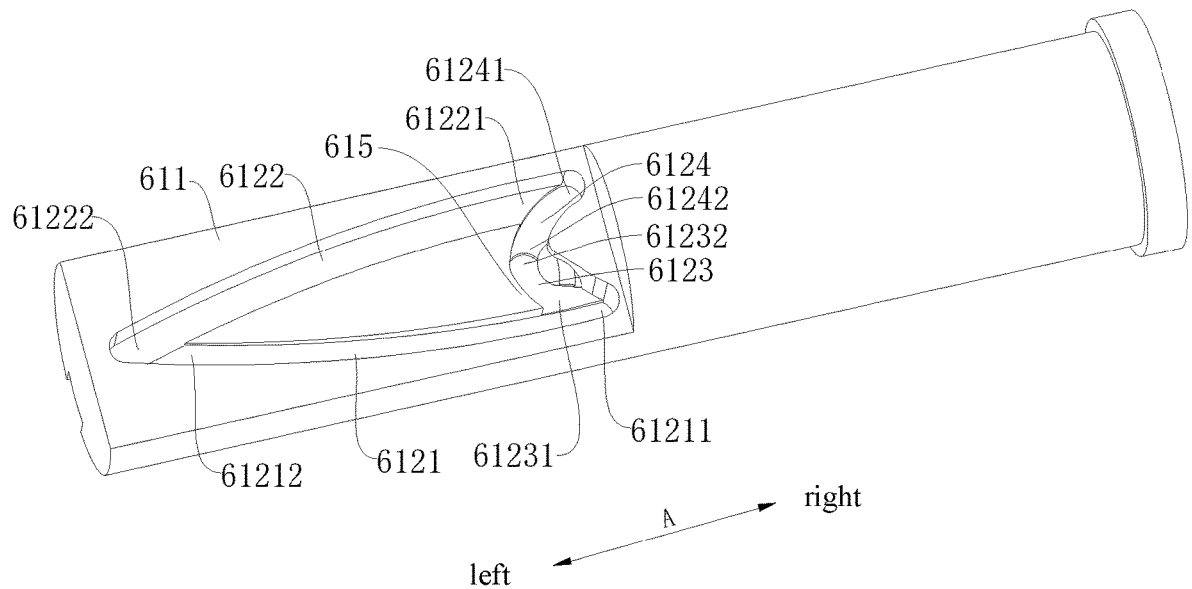
FIG. 19 is a perspective view of a pen base according to an embodiment of the present disclosure.
Figure 20:
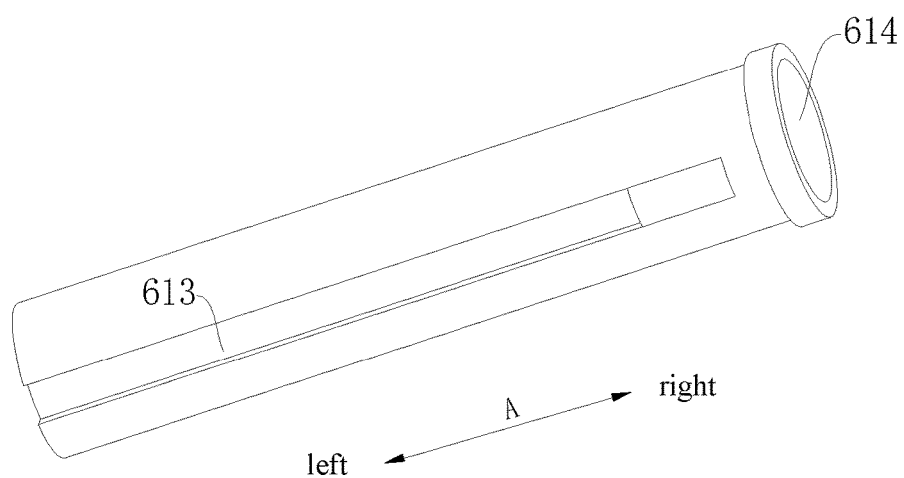
FIG. 20 is another perspective view of a pen base according to an embodiment of the present disclosure.
Figure 21:
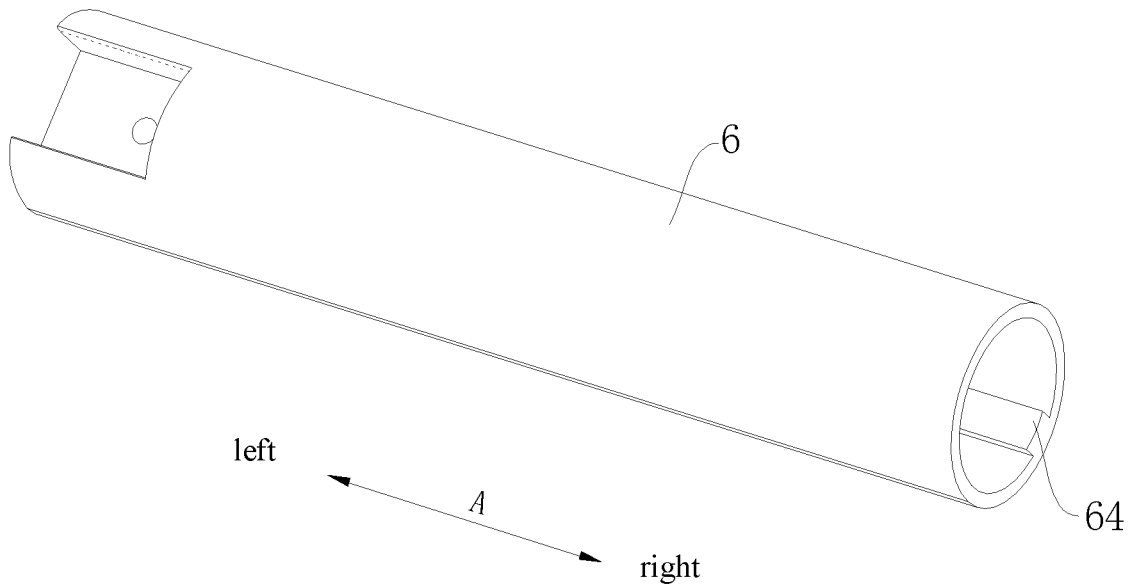
FIG. 21 is a perspective view of a fixed tube according to an embodiment of the present disclosure.
Figure 24:
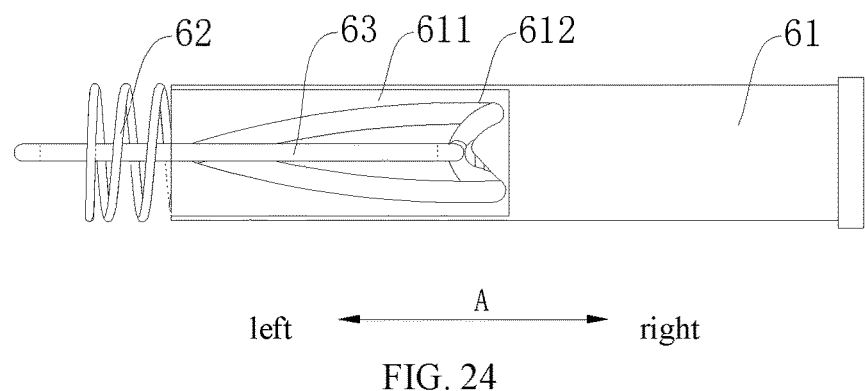
FIG. 24 is a schematic view of the accommodating cylinder in FIG. 23, in which the cylinder body and a fixed tube of the accommodating cylinder are hidden.

As illustrated in FIGS. 18, 19 and 24, the annular sliding groove 612 further includes a first transition section 6123 and a second transition section 6124. A fifth end 61231 of the first transition section 6123 is adjacent to the input-output opening for the touch pen relative to a sixth end 61232 of the first transition section 6123 in the preset direction (the left-right direction). The fifth end 61231 and the first end 61211 are communicated with each other at a first transition point of the annular sliding groove 612.

A seventh end 61241 of the second transition section 6124 is adjacent to the input-output opening for the touch pen in the preset direction (the left-right direction) relative to an eighth end 61242 of the second transition section. The seventh end 61241 and the third end 61221 are communicated with each other at a second transition point of the annular sliding groove 612. The eighth end 61242 and the sixth end 61232 are communicated with each other at the retraction point. A part of the pen base 61 between the extension section 6121 and the first transition section 6123 is configured as the stop portion 615.

Thus, when the pen base 61 is in the inserted position, the stop portion 615 stops the limiting portion such that the limiting portion and the annular sliding groove 612 of the pen base 61 cannot move relative to each other, that is, the limiting portion is prevented from entering the first transition section 6123 and hence the pen base 61 stays in the inserted position. Thus, the touch pen 2 connected to (placed on) the pen base 61 may also stay in the inserted position, so as to achieve that the touch pen 2 is placed in the accommodating cavity of the accommodating cylinder 100.

When the touch pen 2 is to be taken out, the limiting portion may enter the first transition section 6123 by pressing the pen base 61 through the touch pen 2, such that the pen base 61 moves leftwards from the inserted position to a first transition position under the action of an external force (a pressing force applied by the touch pen 2), that is, the limiting portion moves rightwards relative to the pen base 61, so as to slide from the sixth end 61232 to the fifth end 61231. That is, the limiting portion moves to the first transition point of the annular sliding groove 612. At this time, the pen base 61 is pressed to the leftmost.

Since the fifth end 61231 is communicated with the first end 61211, the limiting portion then moves to the first end 61211. Since the elastic member 62 is in the deformed state to normally push the pen base 61 towards the pop-up position, when the touch pen is released, the pen base 61 moves rightwards from the first transition position to the pop-up position under the action of the elastic force of the elastic member 62, that is, the limiting portion moves leftwards relative to the pen base 61, so as to slide from the first end 61211 to the second end 61212. That is, the limiting portion moves to the extension point of the annular sliding groove 612. At this time, the pen base 61 is in the pop-up position, and due to the action of the elastic member 62, the pen base 61 cannot automatically move from the pop-up position to the inserted position.

Since the second end 61212 is communicated with the fourth end 61222, if the pen base 61 is pressed through the touch pen 2 at this time, the limiting portion may enter the fourth end 61222 from the second end 61212, so as to enter the retraction section 6122. Under the action of the external force (the pressing force applied by the touch pen 2), the pen base 61 moves leftwards from the pop-up position to a second transition position, that is, the limiting portion moves rightwards relative to the pen base 61, so as to slide from the fourth end 61222 to the third end 61221. That is, the limiting portion moves to the second transition point of the annular sliding groove 612. At this time, the pen base 61 is pressed to the leftmost.

Since the third end 61221 is communicated with the seventh end 61241, the limiting portion then moves to the seventh end 61241. If the touch pen is released at this time, the pen base 61 may move rightwards from the second transition position to the inserted position under the action of the elastic force of the elastic member 62, that is, the limiting portion moves leftwards relative to the pen base 61, so as to slide from the seventh end 61241 to the eighth end 61242, i.e. the limiting portion moves to the retraction point of the annular sliding groove 612.

Since the eighth end 61242 is communicated with the sixth end 61232, the limiting portion then slides to the sixth end 61232 of the first transition section 6123. Since the stop portion 615 stops the limiting portion such that the limiting portion and the annular sliding groove 612 of the pen base 61 cannot move relative to each other, that is, the limiting portion is prevented from entering the first transition section 6123, and thus, the pen base 61 may stay in the inserted position.

When the above process is repeated, it is possible to achieve that the pen base 61 and the touch pen 2 move from the pop-up position to the inserted position by pressing the touch pen 2 once, and the pen base 61 and the touch pen 2 move from the inserted position to the pop-up position by pressing the touch pen 2 again. As repeated in this manner, it is more convenient to achieve the easy access to the touch pen 2 and the safe storage of the touch pen 2.

As illustrated in FIGS. 17 to 23, the cylinder body 1 includes a body portion and a fixed tube 6. The body portion has the accommodating cavity, the fixed tube 6 is arranged in the accommodating cavity, and an axial direction of the fixed tube 6 is the same with the preset direction (the left-right direction). The pen base 61 is provided with a guide groove 613 extending in the left-right direction, and an inner peripheral surface of the fixed tube 6 is provided with a guide protrusion 64 fitted with the guide groove 613, such that the pen base 61 may move more accurately in the preset direction (the left-right direction).

At least a part of the pen base 61 in the inserted position is located in the fixed tube 6, and a part of the pen base 61 in the pop-up position extends out of the fixed tube 6. Each of the limiting portion and the elastic member 62 is connected to the fixed tube 6. Thus, the limiting portion, the elastic portion 62 and the pen base 61 may be mounted in the fixed tube 6 first, and then the limiting portion, the elastic portion 62, the pen base 61 and the fixed tube 6 are mounted in the accommodating cavity as a whole, so as to facilitate the assembling.

In some embodiments, a bottom wall surface of the fourth end 61222 is located on an inner side of a bottom wall surface of the second end 61212. That is, the bottom wall surface of the fourth end 61222 is recessed inwards relative to the bottom wall surface of the second end 61212. Thus, a bottom wall surface of the annular sliding groove 612 has a stepped portion that prevents the limiting portion from moving from the fourth end 61222 to the second end 61212. In this way, when the pen base 61 is in the pop-up position and is pressed by the touch pen 2, the limiting portion can only slide along the retraction section 6122 from the fourth end 61222 to the third end 61221 more reliably while moving relative to the pen base 61, thereby reliably ensuring that the pen base 61 can be moved from the pop-up position to the inserted position by pressing the pen base 61 once.

As illustrated in FIG. 19, a bottom wall surface of the first end 61211 is located on an inner side of a bottom wall surface of the fifth end 61231, that is, the bottom wall surface of the first end 61211 is recessed inwards relative to the bottom wall surface of the fifth end 61231. Thus, the bottom wall surface of the annular sliding groove 612 has a stepped portion that prevents the limiting portion from moving from the first end 61211 to the fifth end 61231. In this way, when the touch pen is released, the limiting portion can be reliably ensured to slide along the extension section 6121, so as to ensure that the pen base 61 can move back and forth between the pop-up position and the inserted position more reliably and accurately.

As illustrated in FIG. 19, a bottom wall surface of the seventh end 61241 is located on an inner side of a bottom wall surface of the third end 61221, that is, the bottom wall surface of the seventh end 61241 is recessed inwards relative to the bottom wall surface of the third end 61221. Thus, the bottom wall surface of the annular sliding groove 612 has a stepped portion that prevents the limiting portion from moving from the seventh end 61241 to the third end 61221. In this way, when the touch pen is released, the limiting portion can be reliably ensured to slide along the second transition section 6124, so as to ensure that the pen base 61 can move back and forth and forth between the pop-up position and the inserted position more reliably and accurately.

As illustrated in FIG. 19, a bottom wall surface of the sixth end 61232 is located on an inner side of a bottom wall surface of the eighth end 61242, that is, the bottom wall surface of the sixth end 61232 is recessed inwards relative to the bottom wall surface of the eighth end 61242. Thus, the bottom wall surface of the annular sliding groove 612 has a stepped portion that prevents the limiting portion from moving from the sixth end 61232 to the eighth end 61242. In this way, when the pen base 61 is in the inserted position and the touch pen is pressed, the limiting portion can be reliably ensured to slide along the first transition section 6123, so as to ensure that the pen base 61 can move back and forth between the pop-up position and the inserted position more reliably and accurately.

In some embodiments, the first transition section 6123 and the second transition section 6124 form a V shape. In other words, the first transition section 6123 and the second transition section 6124 form a V-shaped transition section. Thus, the limiting portion can slide more smoothly in the first transition section 6123 and the second transition section 6124.

In some embodiments, as illustrated in FIG. 19, the annular sliding groove 612 is heart-shaped. Thus, the first transition section 6123, the extension section 6121, the retraction section 6122 and the second transition section 6124 may be substantially arc-shaped, and also transitions among the first transition section 6123, the extension section 6121, the retraction section 6122 and the second transition section 6124 are much smoother, so as to improve the structural strength of the pen base 61 and the annular sliding groove 612 in the pen base 61. Moreover, the limiting portion can slide more smoothly in the first transition section 6123 and the second transition section 6124.

Specifically, as illustrated in FIG. 19, a part of the outer peripheral surface of the pen base 61 is configured as a flat surface 611, and the first transition section 6123, the second transition section 6124, the extension section 6121 and the retraction section 6122 are formed in the flat surface 611, so as to reduce the processing difficulty of the annular sliding groove 612, and also to facilitate the limiting portion to be easily fitted with each of the first transition section 6123, the second transition section 6124, the extension section 6121 and the retraction section 6122.

Figure 22:
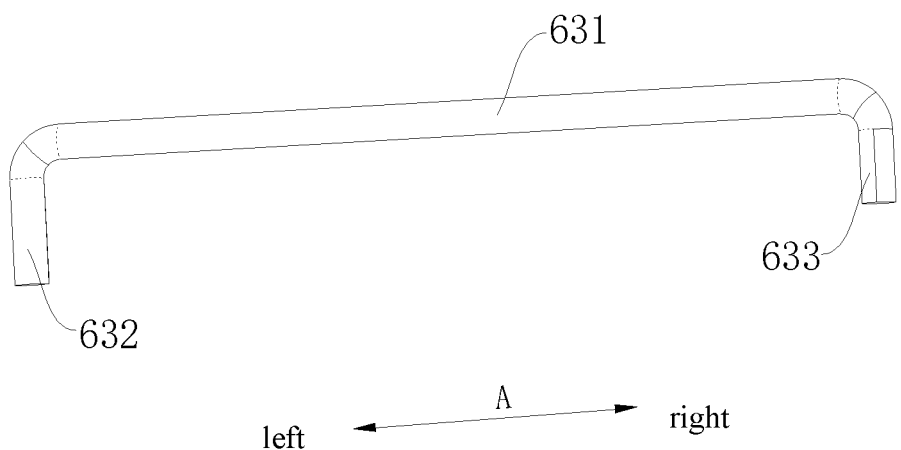
FIG. 22 is a perspective view of a pop-up rod according to an embodiment of the present disclosure.
Figure 23:
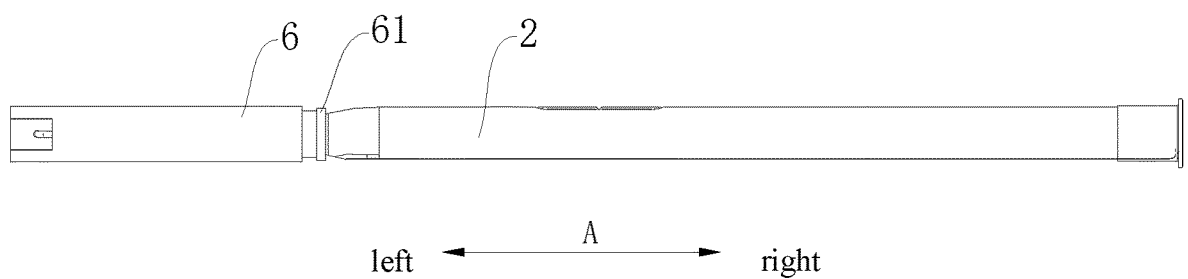
FIG. 23 is a schematic view of an accommodating cylinder fitted with a touch pen in an inserted position according to the embodiment of the present disclosure, in which a cylinder body of the accommodating cylinder is hidden.

As illustrated in FIGS. 18, 22 and 24, the accommodating cylinder 100 according to the embodiment of the present disclosure further includes a pop-up rod 63, and the pop-up rod 63 includes a rod body 631, a first bent portion 632 and a second bent portion 633.

The elastic member 62 is a coil spring. The rod body 631 is in contact with an inner ring of the elastic member 62, and located between the elastic member 62 and the bottom wall surface of the annular sliding groove 612 in the inner-outer direction. Each of the first bent portion 632 and the second bent portion 633 is connected with the rod body 631, and the first bent portion 632 is adjacent to the input-output opening for the touch pen in the preset direction (the left-right direction) relative to the second bent portion 633. The second bent portion 633 is rotatably connected with the cylinder body 1 to ensure that the first bent portion 632 slides smoothly along the annular sliding groove 612. At least a part of the first bent portion 632 is fitted in the annular sliding groove 612, and is configured as the limiting portion.

When the at least part of the first bent portion 632 is fitted in the annular sliding groove 612 and moves along the annular sliding groove 612, since the rod body 631 is in contact with the inner ring of the elastic member 62, the inner ring of the elastic member 62 applies a certain pressing force to the rod body 631, such that the limiting portion formed by the at least part of the first bent portion 632 can be always in contact with the bottom wall surface of the annular sliding groove 612 (that is, the bottom wall surface of the first transition section 6123, the bottom wall surface of the extension section 6121, the bottom wall surface of the retraction section 6122 and the bottom wall surface of the second transition section 6124). Thus, the pop-up rod 63 can be prevented from moving outwards to be separated from the bottom wall surface, so as to ensure that the pen base 61 can move back and forth between the pop-up position and the inserted position more reliably.

In some embodiments, when the pen base 61 is in the pop-up position, the elastic member 62 is in the deformed state to normally push the pen base 61 towards the pop-up position. Thus, the pen base 61 can be more stably located in the pop-up position, so as to improve the working reliability of the accommodating cylinder 100.

In the descriptions of the embodiments of the present disclosure, it should be understood that, terms such as "center", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial" and "peripheral" should be construed to refer to the orientation as then described or as shown in the drawings under discussion, These relative terms are for convenience of description and do not require that the present disclosure be constructed or operated in a particular orientation, which cannot be construed as a limit to the present application.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, it should be noted, unless specified or limited otherwise, the terms "mounted," "connected," "coupled" "fixed" or the like are used broadly. The terms may indicate, for example, fixed connections, detachable connections, or integral connections, may also indicate mechanical or electrical connections or mutual communication, may also indicate direct connections or indirect connections via intermediate mediums, and may also indicate inner communications of two elements or the interaction between two elements. The specific meanings of the terms in embodiments of the present disclosure may be understood by those skilled in the art according to particular circumstances.

In the descriptions of the present disclosure, it should be noted that, unless otherwise expressly specified and limited, the first feature "on" or "under" the second feature may be that the first and second features are in direct contact, or that the first and second features are in indirect contact through an intermediate medium. Moreover, the first feature "over", "above" and "on" the second feature may be that the first feature is directly above or obliquely above the second feature, or merely be that the first feature has a level higher than the second feature. The first feature "beneath", "below" and "under" the second feature may be that the first feature is directly below or obliquely below the second feature, or merely be that the first feature has a level less than the second feature.

Reference throughout this disclosure to "an embodiment", "some embodiments", "an example", "a specific example", or "some examples" means that a particular feature, structure, material, or characteristic described in connection with the embodiment or example is included in at least one embodiment or example of the present application. In this specification, exemplary descriptions of aforesaid terms are not necessarily referring to the same embodiment or example. Furthermore, the particular features, structures, materials, or characteristics may be combined in any suitable manner in one or more embodiments or examples. In addition, without conflicting, various embodiments or examples or features of various embodiments or examples described in the present specification may be combined by those skilled in the art.

Although embodiments of present disclosure have been shown and described above, it should be understood that above embodiments are just exemplary, and cannot be construed to limit the present disclosure, for those skilled in the art, changes, alternatives, and modifications can be made to the embodiments without departing from the scope of the present disclosure.

What is claimed is:

1. An accommodating cylinder, comprising:
   a cylinder body having an accommodating cavity;
   a first magnetic member configured to generate a first magnetic field, and arranged in the accommodating cavity;
   a second magnetic member, at least one of the first magnetic member and the second magnetic member being a coil, the second magnetic member being arranged in the accommodating cavity and movable between a retracted position and an extended position; and
   a pen base connected with the second magnetic member, wherein the second magnetic member is configured to move relative to the first magnetic member from the retracted position to the extended position, and to drive the pen base to move from an inserted position to a pop-up position in a first power-on state.

2. The accommodating cylinder according to claim 1, wherein the second magnetic member is configured to move relative to the first magnetic member from the extended position to the retracted position in a second power-on state.

3. The accommodating cylinder according to claim 1, wherein the first magnetic member comprises an inner magnetic member and an outer magnetic member, a first magnetic pole of the inner magnetic member is arranged opposite to a first magnetic pole of the outer magnetic member, polarity of the first magnetic pole of the inner magnetic member is opposite to polarity of the first magnetic pole of the outer magnetic member, and the second magnetic member is a coil wound between the first magnetic pole of the inner magnetic member and the first magnetic pole of the outer magnetic member.

4. The accommodating cylinder according to claim 3, further comprising a cantilever shaft arranged in the cylinder body, wherein the outer magnetic member is arranged on an inner peripheral surface of the cylinder body, and the inner magnetic member is arranged on an outer peripheral surface of at least a part of the cantilever shaft.

5. The accommodating cylinder according to claim 4, wherein a plurality of outer magnetic members are provided, the plurality of outer magnetic members are spaced apart from each other on the inner peripheral surface of the cylinder body along a circumferential direction of the cylinder body, a plurality of inner magnetic members are provided, the plurality of inner magnetic members are spaced apart from each other on the outer peripheral surface of the cantilever shaft along a circumferential direction of the cantilever shaft, and the plurality of outer magnetic members and the plurality of inner magnetic members are in one-to-one correspondence in an inner-outer direction.

6. The accommodating cylinder according to claim 4, further comprising a power supply member, wherein the power supply member is arranged in the accommodating cavity and electrically connected with the coil, and the power supply member comprises a power supply switch configured to control the coil to be in a power-off state, the first power-on state or a second power-on state.

7. The accommodating cylinder according to claim 6, wherein the power supply member further comprises a battery and a circuit board, the battery is connected to an end of the circuit board, the cantilever shaft is connected to another end of the circuit board, and the circuit board is connected to the coil through a wavy wire.

8. A touch pen assembly, comprising:
   an accommodating cylinder comprising:
      a cylinder body having an accommodating cavity;
      a first magnetic member configured to generate a first magnetic field, and arranged in the accommodating cavity;
      a second magnetic member, at least one of the first magnetic member and the second magnetic member being a coil, the second magnetic member being arranged in the accommodating cavity and movable between a retracted position and an extended position; and
      a pen base connected with the second magnetic member,
      wherein the second magnetic member is configured to move relative to the first magnetic member from the retracted position to the extended position, and to drive the pen base to move from an inserted position to a pop-up position in a first power-on state; and
   a touch pen detachably fitted with the pen base, a part of the touch pen in the pop-up position extending out of the accommodating cavity.

9. The touch pen assembly according to claim 8, wherein the pen base is provided with an elastic portion, the elastic portion has an insertion hole, and the touch pen is detachably fitted in the insertion hole.

10. The touch pen assembly according to claim 8, wherein the touch pen further comprises a third magnetic member, the accommodating cylinder further comprises a fourth magnetic member and a fifth magnetic member;

when the touch pen is in the pop-up position, the third magnetic member and the fourth magnetic member are attracted to each other; and when the touch pen is in the inserted position, the third magnetic member and the fifth magnetic member are attracted to each other.

11. The touch pen assembly according to claim 8, wherein the accommodating cylinder further comprises a charging transmitting module, when the touch pen is in the inserted position, the charging transmitting module is fitted with a charging receiving module of the touch pen to charge the touch pen.

12. The touch pen assembly according to claim 11, wherein the accommodating cylinder further comprises a Hall switch configured to detect a position state of the touch pen and control the charging transmitting module to be switched on or off according to a detected result.

13. A protective case, configured to be assembled with a tablet computer and a keyboard, comprising:

a support plate comprising a first connecting portion configured to be detachably connected to the tablet computer and a second connecting portion configured to be detachably connected to the keyboard; and an accommodating cylinder connected to the first connecting portion and the second connecting portion, the accommodating cylinder comprising:

a cylinder body having an accommodating cavity;

a first magnetic member configured to generate a first magnetic field, and arranged in the accommodating cavity;

a second magnetic member, at least one of the first magnetic member and the second magnetic member being a coil, the second magnetic member being arranged in the accommodating cavity and movable between a retracted position and an extended position; and a pen base connected with the second magnetic member, wherein the second magnetic member is configured to move relative to the first magnetic member from the retracted position to the extended position, and to drive the pen base to move from an inserted position to a pop-up position in a first power-on state.

14. The protective case according to claim 13, wherein the accommodating cylinder comprises an electrical connector, and the electrical connector is electrically connected with the tablet computer and the keyboard in a use state, wherein the electrical connector is configured for transmitting data between the tablet computer and the keyboard, and transmitting an external current to supply power to the tablet computer.

15. The protective case according to claim 13, wherein the accommodating cylinder comprises an electrical connector, and the electrical connector is electrically connected with the tablet computer and the keyboard in a use state, wherein the electrical connector is configured for transmitting data between the tablet computer and the keyboard, and transmitting a current of the tablet computer to supply power to the keyboard.

16. The protective case according to claim 14, wherein an end of the accommodating cylinder is provided with a charging port configured to be connected with an external power source, and the charging port is connected to the electrical connector.

17. The protective case according to claim 15, wherein an end of the accommodating cylinder is provided with a charging port configured to be connected with an external power source, and the charging port is connected to the electrical connector.

18. The protective case according to claim 13, wherein the first connecting portion is provided with a sixth magnetic member configured to be attracted with the tablet computer.

19. The protective case according to claim 13, wherein the second connecting portion is provided with a seventh magnetic member configured to be attracted with the keyboard.

20. The protective case according to claim 13, wherein the first connecting portion comprises a main support plate and an auxiliary support plate, an end of the auxiliary support plate is rotatably connected to the main support plate, such that the auxiliary support plate is configured to rotate by a predetermined angle relative to the main support plate.

* * * * *